United States Patent
Sinclair et al.

(10) Patent No.: US 8,321,420 B1
(45) Date of Patent: Nov. 27, 2012

(54) PARTITION ELIMINATION ON INDEXED ROW IDS

(75) Inventors: Paul L. Sinclair, Manhattan Beach, CA (US); Ganesan Gopal, Alameda, CA (US)

(73) Assignee: Teradata US, Inc., Dayton, OH (US)

( * ) Notice: Subject to any disclaimer, the term of this patent is extended or adjusted under 35 U.S.C. 154(b) by 1796 days.

(21) Appl. No.: 10/732,562

(22) Filed: Dec. 10, 2003

(51) Int. Cl.
*G06F 17/30* (2006.01)

(52) U.S. Cl. ........................................................ 707/741

(58) Field of Classification Search .............. 707/2, 100, 707/102, 3
See application file for complete search history.

(56) References Cited

U.S. PATENT DOCUMENTS

| | | | | |
|---|---|---|---|---|
| 5,548,770 A | * | 8/1996 | Bridges | 707/2 |
| 5,553,303 A | * | 9/1996 | Hayashi et al. | 707/2 |
| 5,742,806 A | * | 4/1998 | Reiner et al. | 707/3 |
| 6,092,062 A | * | 7/2000 | Lohman et al. | 707/2 |
| 6,263,337 B1 | * | 7/2001 | Fayyad et al. | 707/6 |
| 6,581,058 B1 | * | 6/2003 | Fayyad et al. | 707/6 |
| 6,931,390 B1 | * | 8/2005 | Zait et al. | 707/2 |
| 2003/0101183 A1 | * | 5/2003 | Kabra et al. | 707/8 |
| 2004/0122845 A1 | * | 6/2004 | Lohman et al. | 707/102 |
| 2004/0260684 A1 | * | 12/2004 | Agrawal et al. | 707/3 |

OTHER PUBLICATIONS

MySQL, "MySQL Optimisation" Oct. 15, 2002 MySQL <http://web.archive.org/web/20021015015030/www.mysql.com/documentation/mysql/bychapter/manual_MySQL_Optimisation.html#MySQL_indexes>, p. 1-35, specifically, p. 21-23.*
Bartels, Toby, "Index" Sep. 28, 2003, Wikipedia <http://en.wikipedia.org/w/index.php?title=Index&oldid=1982639>, p. 1.*

* cited by examiner

*Primary Examiner* — Etienne Leroux
(74) *Attorney, Agent, or Firm* — Howard Speight

(57) ABSTRACT

A method, computer program, and database system for performing a request on a table associated with an index are disclosed. A database contains a table, an index, and a partition elimination list and accepts a query. A table has one or more rows stored in one or more partitions. The index contains index entries, each of which references a row in a partition, where the row is in the table. The query has a first and a second condition. The partition elimination list is populated with partitions based on the first condition of the query. Only index entries that are identified by the request because of the second condition and that reference partitions that are not eliminated by the partition elimination list are read.

48 Claims, 16 Drawing Sheets

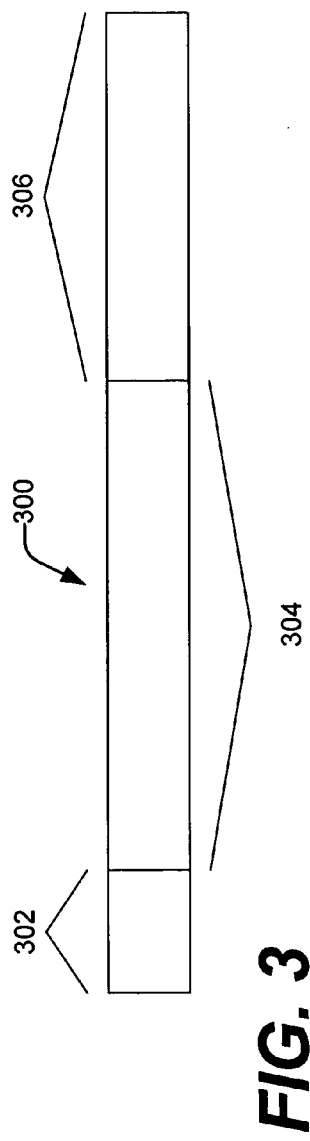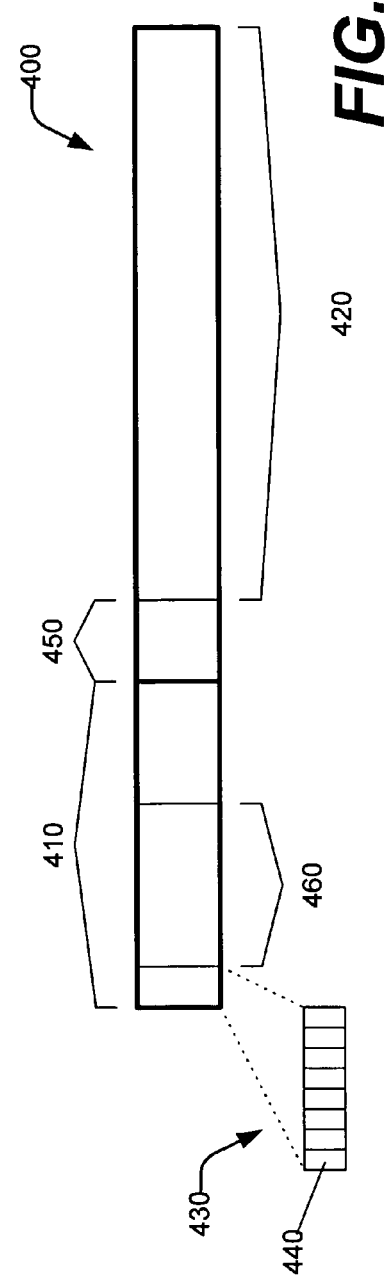

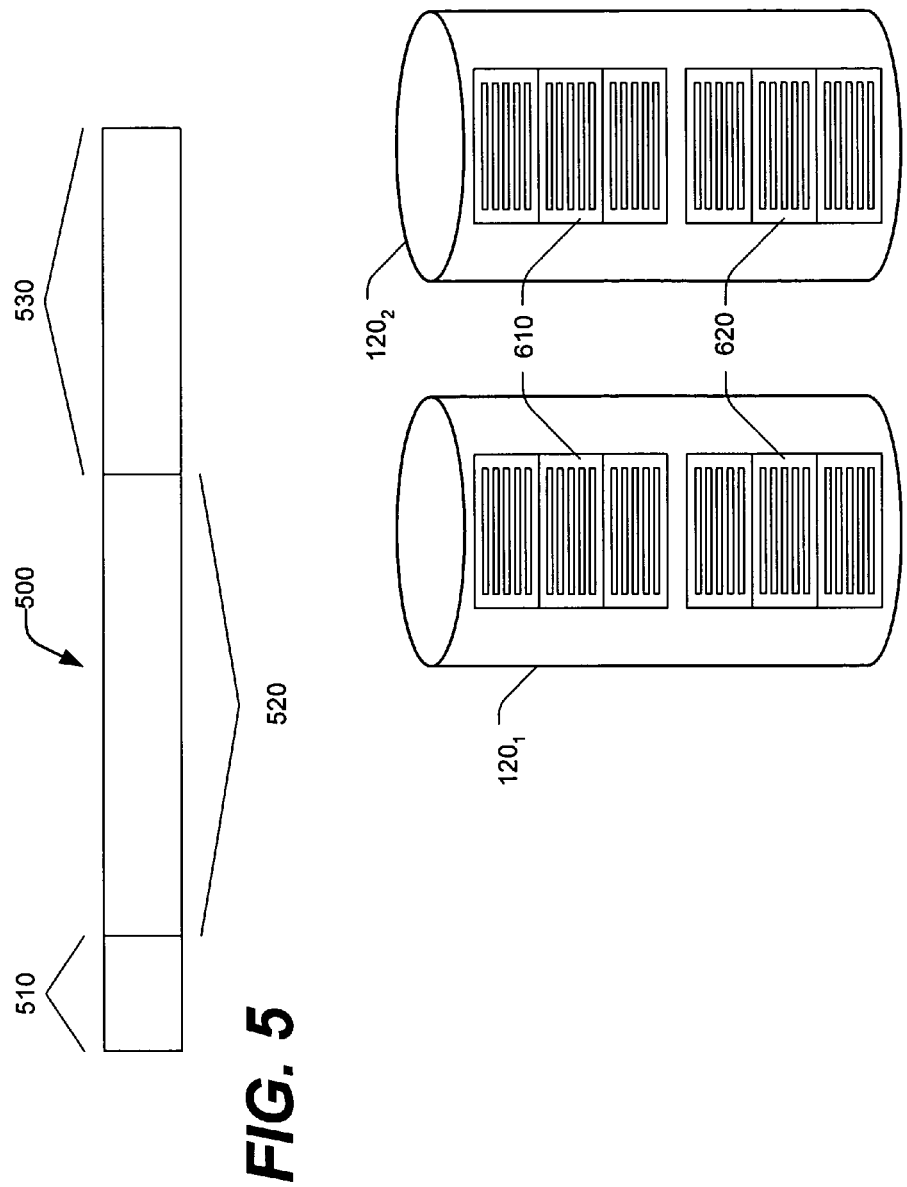

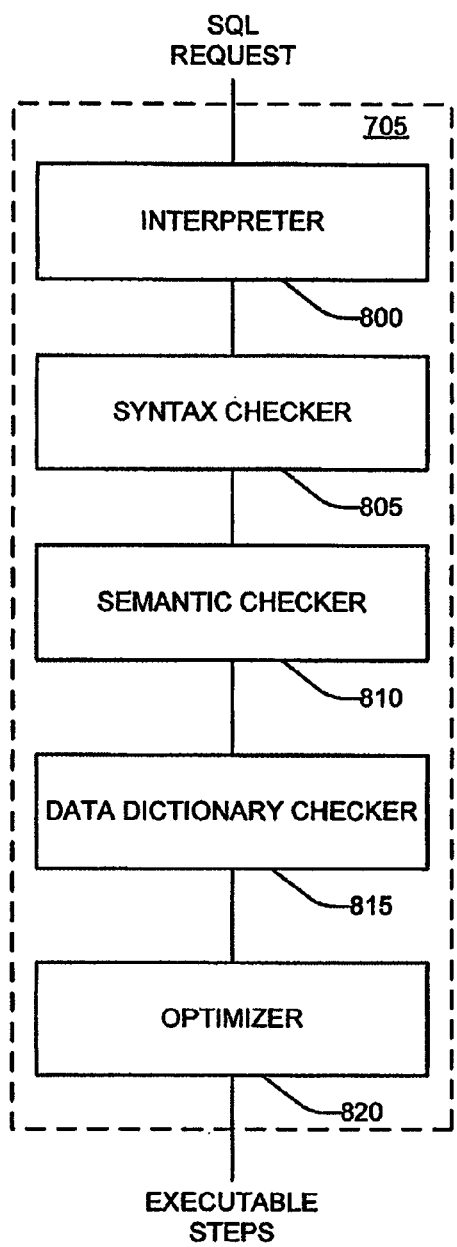
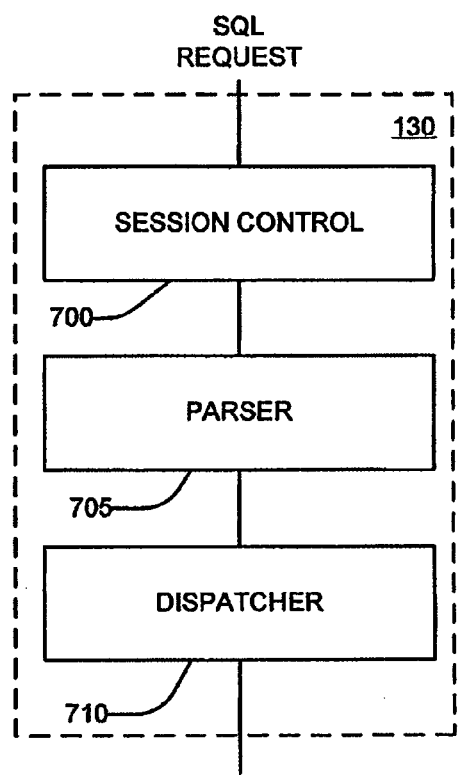
FIG. 7
FIG. 8

PARTITION ELIMINATION ON INDEXED ROW IDS

BACKGROUND

Data organization is important in relational database systems that deal with complex queries against large volumes of data. Relational database systems allow data to be stored in tables that are organized as both a set of columns and a set of rows. Standard commands are used to define the columns and rows of tables and data is subsequently entered in accordance with the defined structure. The defined table structure is logically maintained, but may not correspond to the physical organization of the data. For example, the data corresponding to a particular table may be split up among a number of physical hardware storage facilities.

Users of relational database systems require the minimum time possible for execution of complex queries against large amounts of data. Different physical types of storage, for example random access memory and hard drives, incur different length delays. In addition, writing to memory or a hard drive is often slower than reading an equivalent amount of data from memory or a hard drive. The organization of data corresponding to tables defined in a relational database system may determine the number of writes and reads that need to be performed in order to execute a common request. If the data is properly organized, performance can be improved by searching a part of the data for queries that can take advantage of that organization. If the data is not organized in a useful way for a request, it will often need to be searched in its entirety to satisfy a request or copied and restructured into a useful organization.

SUMMARY

In general, in one aspect, the invention features a partition-sensitive index-assisted method for accessing a database. The database includes a first table. The first table includes one or more rows stored in one or more partitions. The database also includes an index that includes one or more index entries, with each index entry referencing a first target row in a first target partition. The first target row is in the first table. The partition-sensitive index-assisted method includes accepting a request having a first condition and a second condition. The partition-sensitive index-assisted method further includes creating a first partition elimination list based on the first condition. The partition-sensitive index-assisted method also includes identifying one or more first target rows implicated by the request because of the second condition. The identification is accomplished using the index. The partition-sensitive index-assisted method also includes reading the target rows identified by the one or more index entries only if the target first partition of the first target row is not eliminated by the first partition elimination list.

Implementations of the invention may include one or more of the following. The first partition elimination list may be a partition inclusion list and the first target row may be eliminated if it is not listed in the first partition elimination list. The first partition elimination list may be a partition exclusion list and the first target row may be eliminated if it is listed in the first partition elimination list. The database may include a partitioning expression for determining into which partition each of the one or more rows is placed. The process for creating the first partition elimination list may include evaluating the first condition in the partitioning expression. The index may be a secondary index or a join index. The database may also include a second table that may include one or more rows stored in one or more partitions. Each index entry of the join index may also reference a second target row in a second target partition where the second target row is in the second table. The database access procedure may include creating a second partition elimination list of second table partitions based on one of the request conditions and reading the target rows identified by the one or more index entries only if the first target partition of the first target row is not eliminated by the first partition elimination list and the second target partition of the second target row is not eliminated by the second partition elimination list. The second partition elimination list may be a partition inclusion list and the second target row may be eliminated if it is not listed in the second partition elimination list. The second partition elimination list may be a partition exclusion list and the second target row may be eliminated if it is listed in the second partition elimination list. The database access procedure may also include determining an estimated cost of using the partition-sensitive method to access the database, where the estimated cost is a normal cost of performing the request multiplied by an adjustment factor. The adjustment factor may be equal to a minimum number of non-eliminated partitions divided by a total number of partitions. The minimum number of non-eliminated partitions may be determined by analyzing the request. The total number of partitions may be determined based on statistics maintained by the database. The total number of partitions may be determined by analyzing a partitioning expression, where the partitioning expression determines into which partition each of the one or more rows is placed. The adjustment factor may be a minimum ratio, such as 0.10.

In general, in another aspect, the invention features a database system. The database system includes a massively parallel processing system having one or more nodes, a plurality of CPUs, where each of the one or more nodes provides access to one or more CPUs. The parallel processing system further includes a plurality of data storage facilities, each of the one or more CPUs providing access to one or more data storage facilities, and P partitions, each partition residing on one or more data storage facilities. The database system further includes a process for performing a request. The database system stores a first table including one or more rows stored in one or more partitions; the database also stores an index including one or more index entries, with each index entry referencing a first target row in a first target partition, where the first target row is in the first table. Performing the request includes accepting a request having a first condition and a second condition, creating a first partition elimination list based of the first condition, identifying, using the index, one or more first target rows implicated by the request because of the second condition, and reading the target rows identified by the one or more index entries, only if the target first partition of the first target row is not eliminated by the first partition elimination list.

Implementations of the invention may include one or more of the following. The first partition elimination list may be a partition inclusion list and the first target row may be eliminated if it is not listed in the first partition elimination list. The first partition elimination list may be a partition exclusion list and the first target row may be eliminated if it is listed in the first partition elimination list. The database system may also include a partitioning expression for determining into which partition each of the one or more rows is placed. The process for creating the first partition elimination list may include evaluating the first condition in the partitioning expression. The index may be a secondary index or a join index. The database may also include a second table that may include one or more rows stored in one or more partitions. Each index entry of the join index may also reference a second target row in a second target partition where the second target row is in the second table. The process of performing the request may also include creating a second partition elimination list of second table partitions based on one of the request conditions and reading the target rows identified by the one or more index entries only if the first target partition of the first target row is not eliminated by the first partition elimination list and the second target partition of the second target row is not eliminated by the second partition elimination list. The second partition elimination list may be a partition inclusion list and the second target row may be eliminated if it is not listed in the second partition elimination list. The second partition elimination list may be a partition exclusion list and the second target row may be eliminated if it is listed in the second partition elimination list. The process of performing the request may also include determining an estimated cost of using the partition-sensitive method to access the database, where the estimated cost is a normal cost of performing the request multiplied by an adjustment factor. The adjustment factor may be equal to a minimum number of non-eliminated partitions divided by a total number of partitions. The minimum number of non-eliminated partitions may be determined by analyzing the request. The total number of partitions may be determined based on statistics maintained by the database. The total number of partitions may be determined by analyzing a partitioning expression, where the partitioning expression determines into which partition each of the one or more rows is placed. The adjustment factor may be a minimum ratio, such as 0.10.

In general, in another aspect, the invention features a computer program, stored on a tangible storage medium. The computer program may be used in indexing spatial objects of a partitioned parallel environment including P partitions, where each partition resides on one or more parallel processing systems and each spatial object has a location in an n-dimensional space. The program includes executable instructions that cause a computer to accept a request having a first condition and a second condition. The program also includes executable instructions that cause the computer to create a first partition elimination list based of the first condition. The program also includes executable instructions that cause the computer to identify, using the index, one or more first target rows implicated by the request because of the second condition. The program also includes executable instructions that cause the computer to read the target rows identified by the one or more index entries, only if the target first partition of the first target row is not eliminated by the first partition elimination list.

Implementations of the invention may include one or more of the following. The first partition elimination list may be a partition inclusion list and the first target row may be eliminated if it is not listed in the first partition elimination list. The first partition elimination list may be a partition exclusion list and the first target row may be eliminated if it is listed in the first partition elimination list. The database system may also include a partitioning expression for determining into which partition each of the one or more rows is placed. The instructions for creating the first partition elimination list may also include instructions for evaluating the first condition in the partitioning expression. The index may be a secondary index or a join index. The database may also include a second table that may include one or more rows stored in one or more partitions. Each index entry of the join index may also reference a second target row in a second target partition where the second target row is in the second table. The instructions for performing the request may also include instructions for creating a second partition elimination list of second table partitions based on one of the request conditions and reading the target rows identified by the one or more index entries only if the first target partition of the first target row is not eliminated by the first partition elimination list and the second target partition of the second target row is not eliminated by the second partition elimination list. The second partition elimination list may be a partition inclusion list and the second target row may be eliminated if it is not listed in the second partition elimination list. The second partition elimination list may be a partition exclusion list and the second target row may be eliminated if it is listed in the second partition elimination list. The instructions for performing the request may also include instructions for determining an estimated cost of using the partition-sensitive method to access the database, where the estimated cost is a normal cost of performing the request multiplied by an adjustment factor. The adjustment factor may be equal to a minimum number of non-eliminated partitions divided by a total number of partitions. The minimum number of non-eliminated partitions may be determined by analyzing the request. The total number of partitions may be determined based on statistics maintained by the database. The total number of partitions may be determined by analyzing a partitioning expression, where the partitioning expression determines into which partition each of the one or more rows is placed. The adjustment factor may be a minimum ratio, such as 0.10.

BRIEF DESCRIPTION OF THE DRAWINGS

FIG. 3 is a data structure of a row identifier (row ID).

FIG. 4 is a data structure for a data row.

FIG. 5 is a data structure for an index row.

FIG. 6 illustrates example storage facilities with partitioned database tables.

FIG. 7 is a block diagram of a parsing engine.

FIG. 8 is a flow chart of a parser.

DETAILED DESCRIPTION

Figure 1:
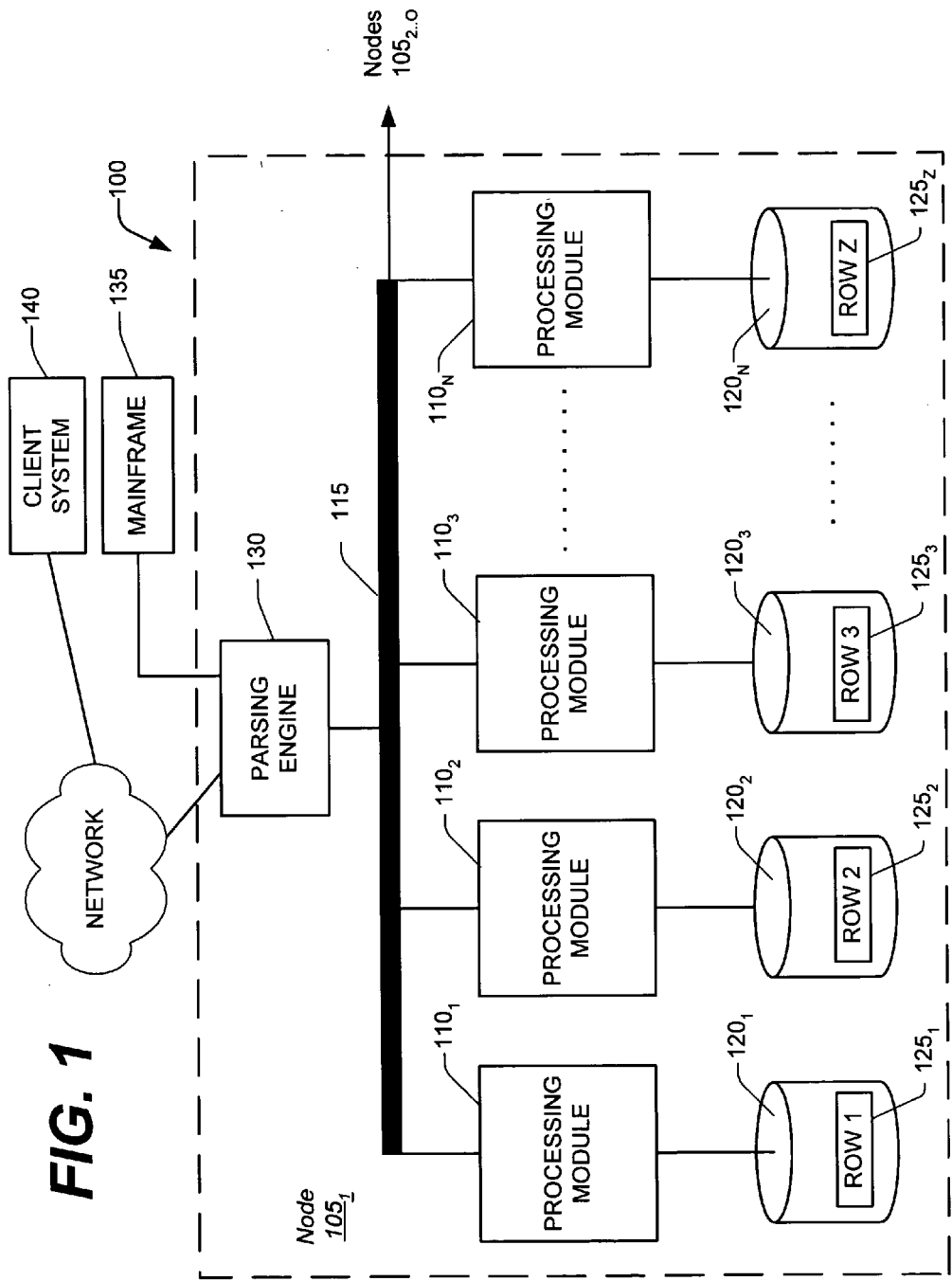
FIG. 1 is a block diagram of a node of a parallel processing database system.

The request optimization technique disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1 \ldots N}$, connected by a network 115, that manage the storage and retrieval of data in data-storage facilities $120_{1 \ldots N}$. Each of the processing modules $110_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The DBS may include multiple nodes $105_{2 \ldots O}$ in addition to the illustrated node $105_1$, connected by extending the network 115.

The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

Figure 2:
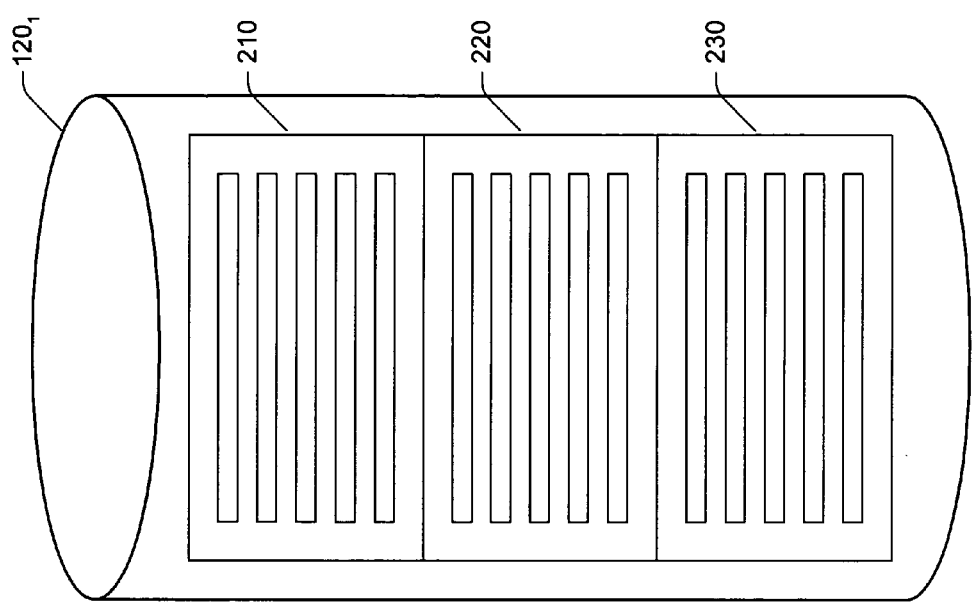
FIG. 2 illustrates an example partitioned database storage facility.

For example, the primary index of a table can be chosen to make equality joins efficient. In one such example table, the primary index is the order number column of an order table. As another example, the primary index of a table may be chosen to implement additional features, including efficient range searches. In an example of such a table, the primary index is chosen to make a search on a range of dates from the date column more efficient. FIG. 2 shows such a design feature, a partitioned database storage facility $120_1$. The rows are allocated to the storage facility $120_1$ as discussed above. The rows are organized within the storage facility $120_1$ in accordance with a partitioning function that uses row ID 300 associated with each row. The row ID is more specifically shown in FIG. 3 and is discussed in more detail below. The row ID includes values associated with the partitioning function as well as values associated with the hash function and a uniqueness value. The rows stored in the storage facility $120_1$ are ordered at a top level by the result of the partitioning function. As a result, a first group of rows 210 has one partitioning function value, a second group of rows 220 has another partitioning function value, and a third group of rows 230 has a third partitioning function value. The groups 210, 220 and 230 are ordered by their respective partition values and are also known as partitions.

The rows are also ordered within each partition. For example, assume that the first partition 210 contains five rows. Those rows are stored within that partition 210 in the order of the hash result for each row. A uniqueness value is also maintained for each row. No two rows with the same partition and hash value in a table can have the same uniqueness value. The uniqueness values are determined when the rows are added to the table. For example, a sequential number (the next uniqueness number after the highest one currently being used) or any currently unused number can be used as the uniqueness value. If two rows are in the same partition and have the same hash value, their order is determined by their uniqueness values, which by definition cannot be identical. The uniqueness value is not used to order rows that have different partition or hash values. In an alternate implementation, uniqueness values are not assigned to the rows and the order of rows with identical hash values is not determined.

One example of a partitioning function returns a number for a row based on the range of values into which that row's value in a certain column falls. For example, if an order table in a database has the order number column as that table's primary index, the partitioning function can operate on the month of the order date. In that situation, the rows of the order table would be distributed to storage facilities based on the result of applying the hash function to the order number. In each storage facility, the rows would be ordered based on a monthly range of dates. For example, the first partition 210 could include all rows assigned to that storage facility with orders in January 2001. The second partition 220 could include all rows for orders in February 2001. Within each partition the rows are in the order of the hash value and, where hash values are the same, in order by uniqueness value. Such a partitioned table could be efficiently searched on ranges by eliminating partitions from the required search. For example, if all orders for a certain product during a two-month period are desired, only two partitions on each storage facility would need to be checked for the specified product. The monthly range is just one example of a possible partitioning function. Any type of deterministic function can be used.

FIG. 3 shows a data structure of a row ID 300. A row ID 300 can be calculated for each row in order to allow quick, correct placement of a newly added row. The database system may store the row ID for each row in a column of that row in addition to the columns defined when the row is created. A complete row ID is not required to be stored with each row (if a uniqueness value is used in the row ID, that value must be stored with the row). As one example, the processing module $110_n$ could recalculate the partitioning function and hash function each time a row is accessed to determine the row ID for the row. The row ID 300 in FIG. 3 has three parts: the partition value 302, the hash value 304, and the uniqueness value 306. In one example the partition value 302 is one byte long, the hash value 304 is four bytes long, and the uniqueness value is three bytes long. As a result, in that example up to 256 partitions can be utilized in storing rows in a storage facility $120_n$. Using the Orders table example, over twenty years of orders could be kept in one-month partitions. The hash value 304 in that implementation could be one of $2^{32}$ possible values. That implementation would allow $2^{24}$ uniqueness values 306. This implementation retains the existing 64-bit size of the row ID the Teradata implementation. A larger number of possible hash values increases the number of data storage facilities that can be used to store rows of the database and reduces the chance that multiple rows will have the same hash value. A larger number of possible uniqueness values allow tables with larger numbers of rows with the same partition and hash value to be stored.

The row ID 300 in another example system includes a 2-byte partition value 302, a 4-byte hash value 404, and a 4-byte uniqueness value 306. In this example, more partitions can be used to store rows and tables with more rows, because of the increase in uniqueness numbers, can be stored. The row ID size is ten bytes overall. Many other row IDs could be implemented that are two- or three-level organization of rows in data storage.

FIG. 4 shows a data structure for a data row. In this implementation, the 10-byte row ID is added to a system initially configured to use an 8-byte row ID, and in which many of the tables in the database are not partitioned. In that case, the 2-byte partition value would be zero for all rows. Partitioned tables would have partition values other than zero for the rows. One example system compresses the 2-byte partition value for the nonpartitioned table rows so that a header defined for an 8-byte row ID can remain unchanged, while including a mechanism for determining the row ID for partitioned table rows. The data row 400 includes a header 410 and a body 420. The header 410 includes at least one bit that is unused in the initial header definition and assigned a reference value. For example, the header 410 can include a Flags byte 430 that includes a high-order bit 440 that is always initialized as zero prior to the addition of partitioning functionality. The high-order bit 440 is used to indicate whether the data row 400 is from a partitioned or nonpartitioned table. If the data row 400 is from a nonpartitioned table, the high-order bit 440 remains zero and the row ID is constructed from the 8-bytes of hash and uniqueness values 460 preceded by 2-bytes of zero, the partition value for a nonpartitioned table. If the data row 400 is from a partitioned table, the high-order bit 440 is set to 1 and the 2-byte partition value 450 is the first portion of the body 420. In one implementation, each row has a row descriptor for identifying the portions of the body 420. The row descriptor is adjusted to account for the addition of the 2-byte partition value 450 at the beginning of the body. Thus, a routine can construct the 10-byte row ID for the nonpartitioned data rows by noting the high-order bit 440 state and adding 2-bytes indicating a zero partition value to the hash and uniqueness values 460 without referencing the row descriptor.

FIG. 5 shows a data structure for an index row 500. In a specific implementation, an index row 500 consists of an identifying row ID (in the row header) 510, row IDs that reference rows in the table 520, and other data (such as the index value) 530. The identifying row ID 510 of an index row 500 is handled the same as for the data row 400. As with the data row 400, a descriptor exists for the contents of the index row 500. This descriptor indicates the size of data values in the row. For a nonpartitioned table, the descriptor indicates that the row IDs have a size of eight bytes and the partition number of zero can be assumed. For a partitioned table, the referenced row IDs are extended with the 2-byte partition number and the descriptor would indicate they have a size of ten bytes.

FIG. 6 shows the rows of two tables 610 and 620 stored in partitions in two data storage facilities $120_{1,2}$. While the rows for each table are partitioned and ordered within the partitions, they are not mixed. If the two tables 610 and 620 are each partitioned according to the same data and have the same primary index, equality joins between the two tables can be conducted within a subset of the storage of each storage facility. Primary indexes can be used to specify the storage locations for different tables within one data storage facility.

Different tables in a database system can have different partitioning functions. For example, the first table 610, an Orders table, can be partitioned by the month of the order date, while the second table 620, a customer table, may be partitioned by the total average yearly purchases of that customer. The partitioning function for a table can be chosen to coincide with range calculations commonly performed on columns in response to queries. If queries that specify date ranges are common, it can be efficient to specify range of dates as the partitioning function. If queries with item types are common, it can be efficient to specify an item type designation as a partitioning function. Each function represents an implementation of the partitioned database system.

Returning to FIG. 1, in one example system, the parsing engine 130 is made up of three components shown in FIG. 7: a session control 700, a parser 705, and a dispatcher 710. The session control 700 provides the logon and logoff function. It accepts a request for authorization to access the database, verifies it, and then either allows or disallows the access.

Once the session control 700 allows a session to begin, a user may submit a SQL request, which is routed to the parser 705. As illustrated in FIG. 8, the parser 705 interprets the SQL request (block 800), checks it for proper SQL syntax (block 805), evaluates it semantically (block 810), and consults a data dictionary to ensure that all of the objects specified in the SQL request actually exist and that the user has the authority to perform the request (block 815). Finally, the parser 705 runs an optimizer (block 820), which develops the least expensive plan to perform the request.

In addition to the primary index, a table may have associated with it one or more secondary indexes, which index the rows of the table based on the values in one or more indexed columns of the table. Each secondary index is stored as a separate data structure from its associated table. Each secondary index may be populated with one or more secondary rows. Each secondary row contains one or more indexed values and one or more row IDs. Each row ID in the secondary index references a row in the associated table containing the indexed values. In one implementation of the secondary index, the rows in the secondary index are arranged sequentially according to the indexed values. With this organization, the time spent searching for indexed values is reduced.

Figure 9:
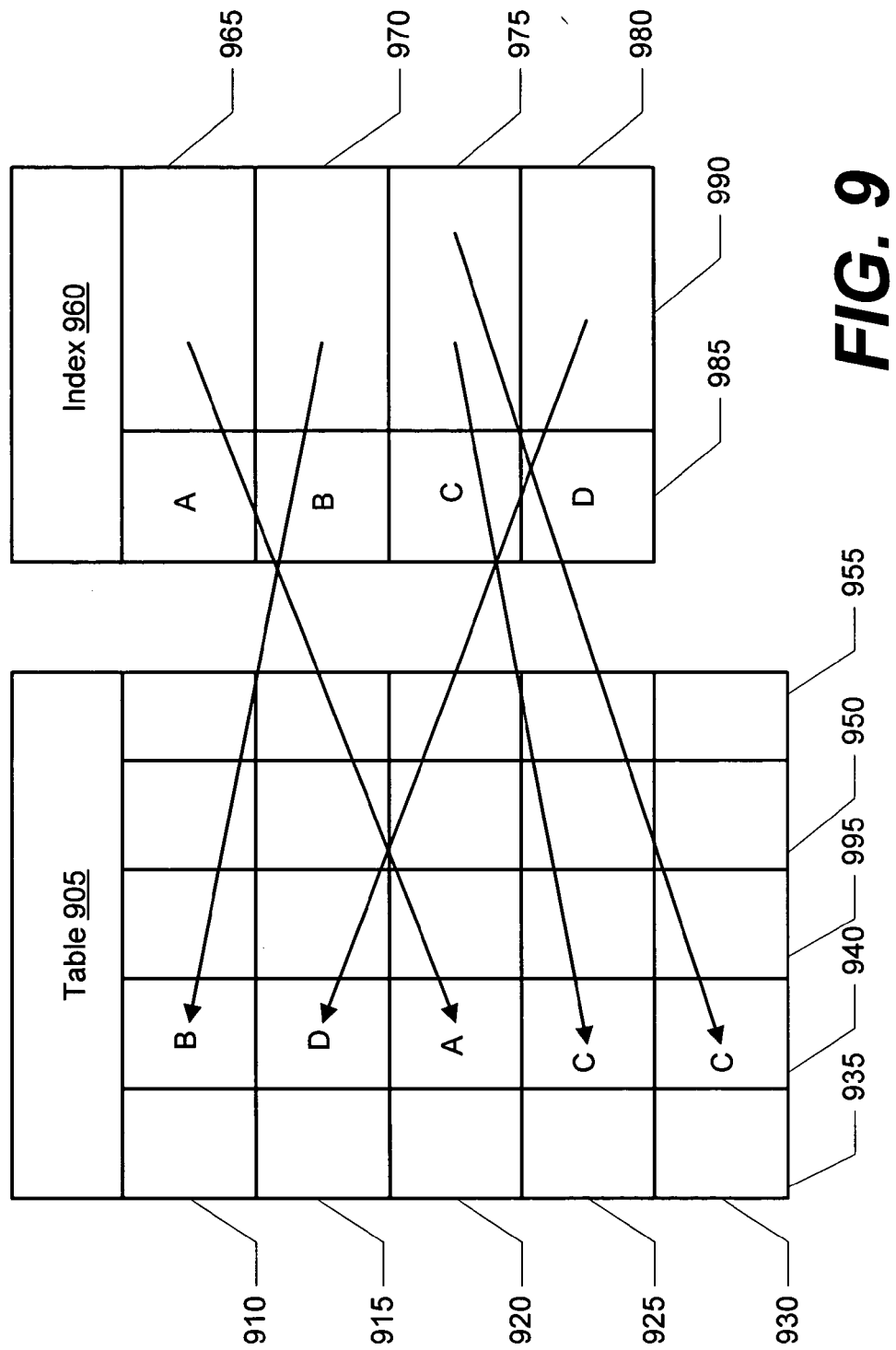
FIG. 9 illustrates a table and an associated secondary index.

FIG. 9 shows an example table 905 and associated index 960. Table 905 includes rows 910, 915, 920, 925 and 930 and columns 935, 940, 945, 950 and 955. Sample values for column 940 are provided for illustration. Secondary index 960 includes rows 965, 970, 975 and 980, and columns 985, and 990. Cells in column 985 contain the indexed values and cells in column 990 contain the row IDs of rows in table 905 containing the index value in column 940. In the illustration, the row IDs have been replaced with arrows to demonstrate the relationship between the table 905 and its associated secondary index 960.

In one example database system, assuming the table 905 is named "t1," the index 1004 is named "sidx," and the column 940 of the table 905 is named "a," an example join index 1004 is created using the following SQL request:
CREATE INDEX sidx (a, ROWID) ON t1;

In addition to the primary index and secondary indexes, the table may have one or more associated join indexes representing a join between two or more tables or a single table projection. Each join index is stored as a separate data structure from its associated table or tables. Each join index may be populated with one or more join index rows. Each join index row contains one or more indexed values. Each join index row may contain one or more row IDs. Each row ID in the join index references a row in one of the associated tables containing the indexed value. In one implementation of the join index, the rows in the join index are arranged sequentially according to the indexed values. With this organization, the time spent searching for indexed values is reduced.

Figure 10:
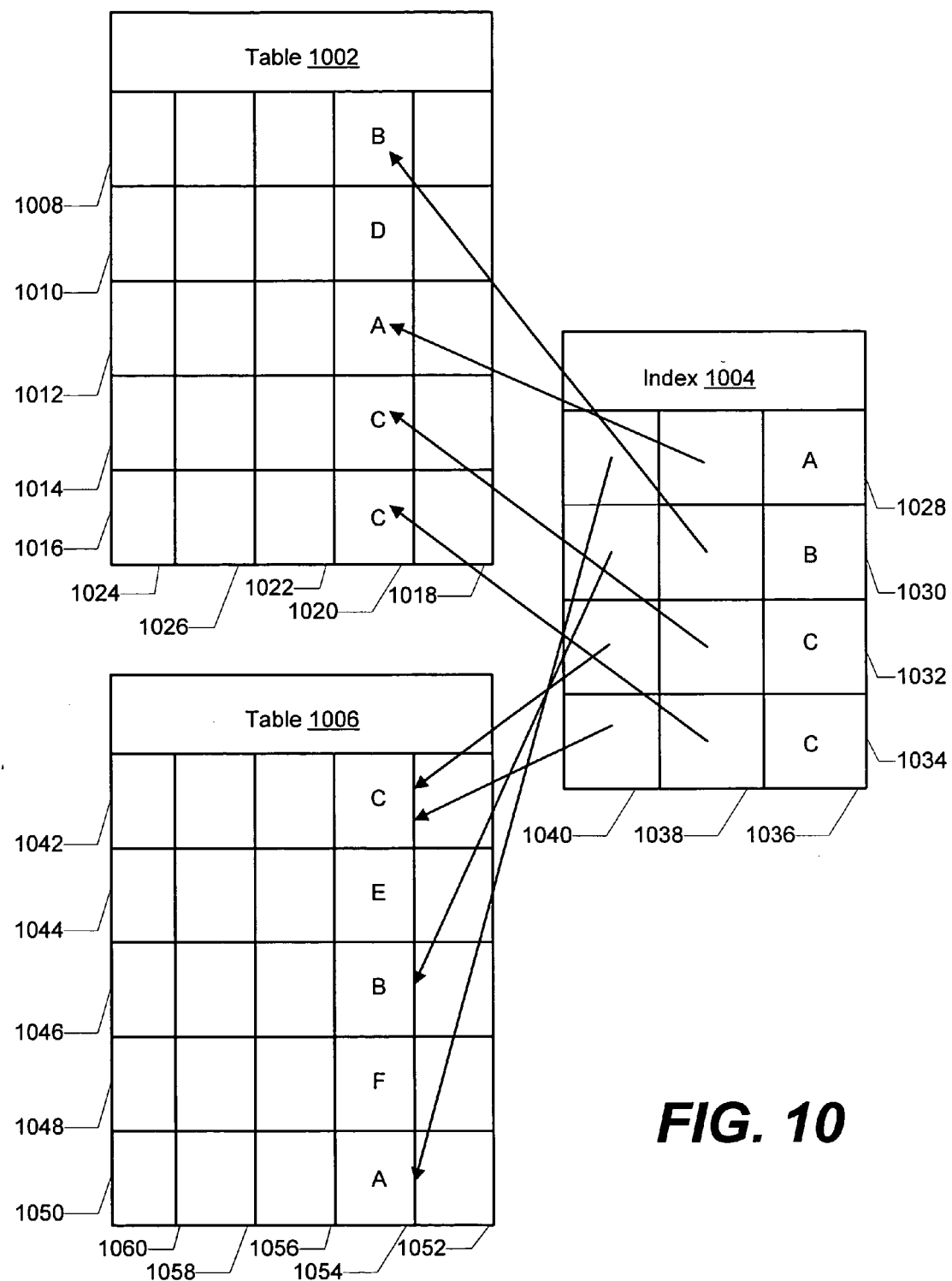
FIG. 10 illustrates two tables and an associated join index.

FIG. 10 shows example tables 1002 and 1006 and associated join index 1004. Table 1002 includes rows 1008, 1010, 1012, 1014 and 1016, and columns 1018, 1020, 1022, 1026 and 1024. Sample values for column 1020 are provided for illustration. Table 1006 includes rows 1042, 1044, 1046, 1048 and 1050, and columns 1052, 1054, 1056, 1058 and 1060. Sample values for column 1054 are provided for illustration. Join index 1004 includes rows 1028, 1030, 1032 and 1034 and columns 1036, 1038 and 1040. Cells in column 1036 contain the indexed value. Cells in column 1038 contain row IDs of rows in table 1002 containing the indexed value in column 1036 and cells in column 1040 contain row IDs of rows in table 1006 containing the indexed value in column 1036. In the illustration, the row IDs have been replaced with arrows to demonstrate the relationship between the tables 1002, and 1006 and the associated join index 1004.

Figure 11:
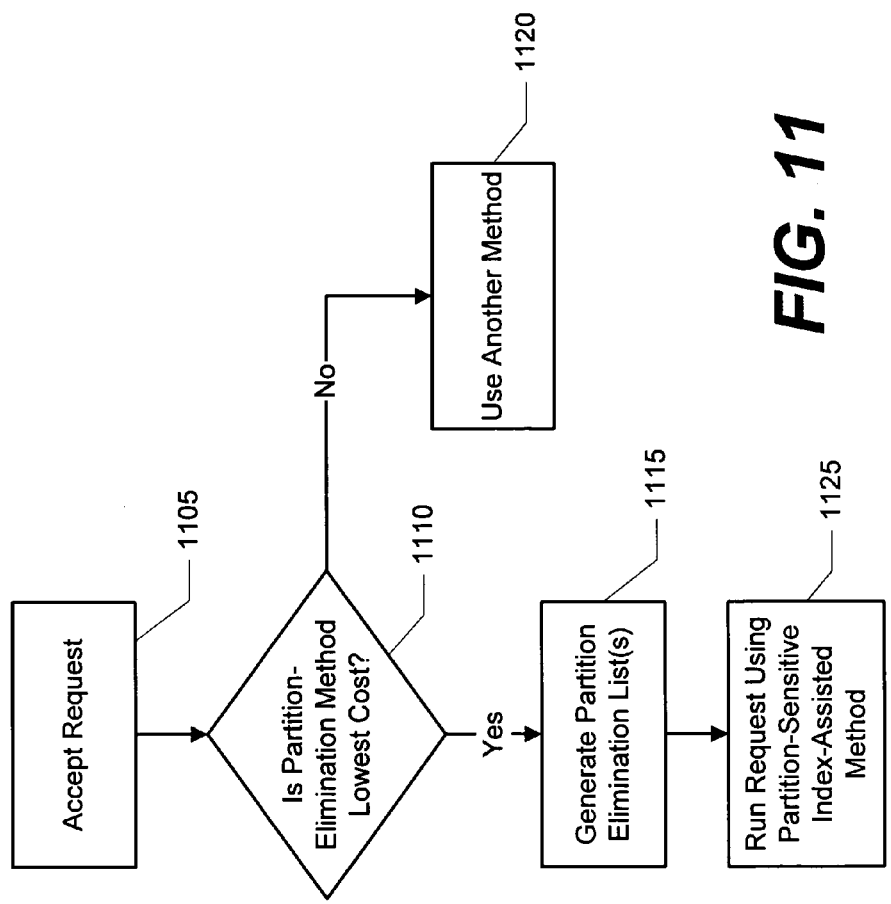
FIG. 11 is a flow chart illustrating request handling using partition elimination.

In one example database system, assuming the table 1002 is named "t1," the table 1006 is named "t2," the join index 1004 is named "jidx," the column 1020 of the table 1002 is named "a," and the column 1054 of the table 1006 is named "a," an example join index 1004 is created using the following SQL request:
CREATE JOIN INDEX jidx AS SELECT t1.a, t1.ROWID, t2.ROWID FROM t1, t2 WHERE t1.a=t2.a;

An example system which takes advantage of the partitioned database to reduce the cost of a request, shown in FIG. 11, receives the SQL request with conditions that implicate both the partitioned primary index and one or more secondary indexes or join indexes (block 1105). The system determines an estimated cost of using a partition-sensitive index-assisted method and other methods to execute the request and determines which method has the lowest cost (block 1110 described in more detail with respect to FIG. 13). If the partition-sensitive index-assisted method is not the lowest-cost alternative, the system will use an alternative method to execute the request (block 1120). If the partition-sensitive index-assisted method is the lowest cost alternative the system generates one or more partition elimination lists (block 1115). The system executes the SQL request using the one or more partition elimination lists with the index (block 1125 described in more detail with respect to FIG. 19).

Figure 12:
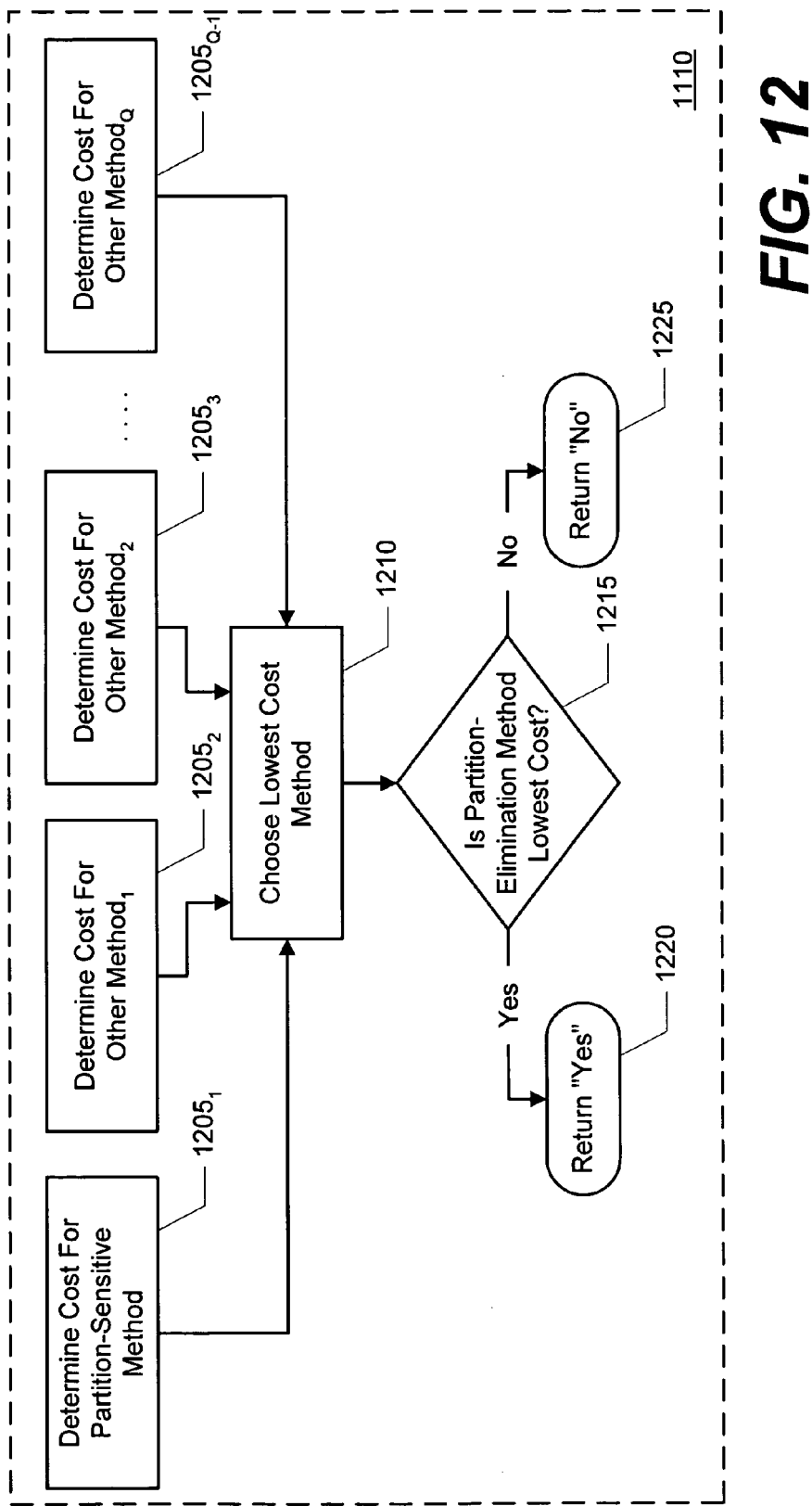
FIG. 12 is a flow chart illustrating the selection of the lowest cost method.

In block 1110, the system determines the cost of using the partition-sensitive index-assisted method and compares this cost with costs to use other methods to execute the request. FIG. 12 shows an example system that determines whether to use the partition-sensitive index-assisted method. The system determines a cost of using the partition-sensitive index-assisted method (block $1205_1$ and discussed in greater detail below) and costs for using one or more (up to Q) other methods (blocks $1205_2$-$1205_{Q-1}$). The system chooses the lowest cost method (block 1210). The system determines if the partition-sensitive index-assisted method is the lowest cost method (block 1215). If the partition-sensitive index-assisted method is the lowest cost method the system returns "Yes" (block 1220). If the partition-sensitive index-assisted method is not the lowest cost method the system returns "No" (block 1225).

Figure 13:
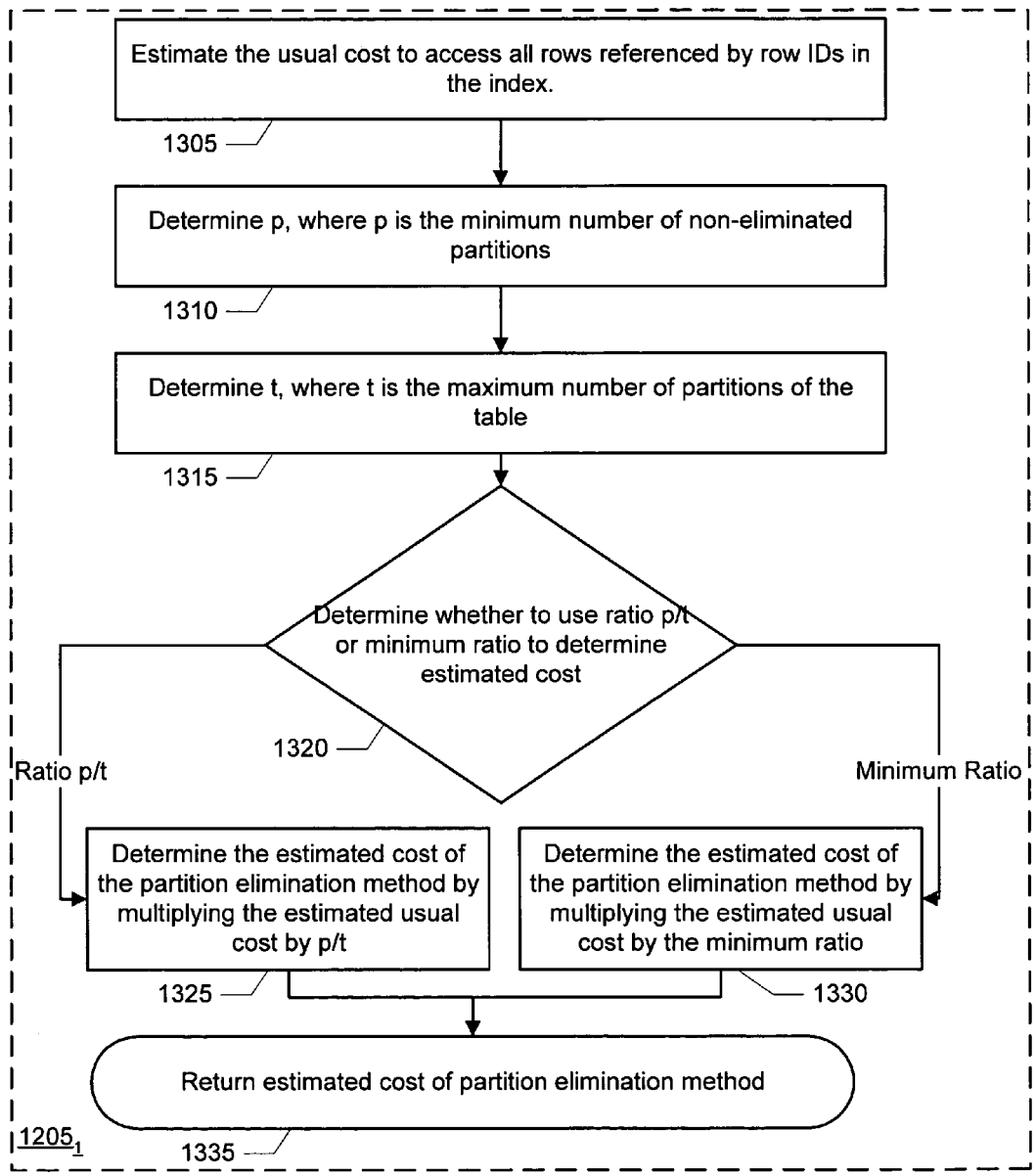
FIG. 13 is a flow chart illustrating the estimation of the cost of the partition-sensitive method.

In block $1205_1$, the system determines the cost of using the partition-sensitive index-assisted method. FIG. 13 shows an example system that determines an estimated cost of using the partition-sensitive index-assisted method. The system determines the usual cost to access all rows referenced by row IDs in the index (block 1305 described in more detail below). The system determines a minimum number of non-eliminated partitions (represented by the variable p) (block 1310 described in more detail below). The system determines a maximum number of partitions in the table (represented by the variable t) (block 1315 described in more detail below). The system determines whether to use the estimated ratio p/t or a minimum ratio (block 1320). If the system uses an estimated ratio p/t, the system determines an estimated cost of the partition-sensitive index-assisted method by multiplying the usual cost to access the index by the ratio p/t (block 1325). If the system uses the minimum ratio, the system determines the estimated cost of the partition-sensitive index-assisted method by multiplying the usual cost to access the index by the minimum ratio (block 1330). The system returns the estimated cost of the partition-sensitive index-assisted method (block 1335).

In block 1305, the system determines the usual cost to access the index. In making this determination, the system considers factors including: an estimated number of rows or data blocks the system will need to read or write, an estimated cost of reading or writing a row, an input/output weighting factor, an estimated CPU cost for evaluating conditions for a row or building a row, and a CPU weighting factor. One example system uses the following formula to determine the usual cost to access all rows referenced by row IDs in the index:

$$\text{Cost}_{Total}=N_{Rows}(\text{Cost}_{I/O}K_{I/O}+\text{Cost}_{CPU}K_{CPU}) \quad \text{(Eq. 1)}$$

In Eq. 1, $\text{Cost}_{Total}$ is the estimated cost to access all rows referenced by row IDs in the index, $N_{Rows}$ is the estimated number of rows or data blocks the system will need to read or write, $\text{Cost}_{I/O}$ is the estimated cost of reading or writing a row, $K_{I/O}$ is the input/output weighting factor, $\text{Cost}_{CPU}$ is the estimated CPU cost for evaluating condition for a row or building a row, and $K_{CPU}$ is the CPU weighting factor.

Another example system determines the usual cost to access the index by considering the following factors: an estimated number of rows that have the index value specified in a condition in the request, an estimated number of blocks that will need to be read to get the corresponding row IDs from the index, a cost of reading a block, an estimated cost of reading all the rows pointed to by the row IDs, and an estimated cost of evaluating conditions on each row read to see if the row satisfies conditions in the request.

In block 1310, the system determines the minimum number of non-eliminated partitions (represented by the variable p). In one example system, the minimum number of non-eliminated partitions is determined by analyzing the request. In one example system, assume an example table has the following definition:
CREATE TABLE Orders
   (orderkey INTEGER NOT NULL,
   orderdate DATE FORMAT 'yyyy-mm-dd' NOT NULL,
   custkey INTEGER,
   total_price DECIMAL(13,2) NOT NULL)
   PRIMARY INDEX (orderkey)
   PARTITION BY RANGE_N(
   orderdate BETWEEN DATE '2000-01-01' AND DATE '2009-12-31'
     EACH INTERVAL '1' MONTH);

This table is partitioned based on date, with partitions split on months. Because the table spans ten years, it can have up to 120 partitions. Assume the following query is run on the table: SELECT*FROM Orders WHERE ((date BETWEEN '2001-01-05' AND '2001-03-02') and total_price>100.00);
The query above implicates only three months. Therefore, the non-implicated 117 months are eliminated and the minimum number of non-eliminated partitions will equal three.

In block 1315, the system determines the total number of partitions in the table (represented by the variable t). In one example system that maintains statistics, including a total number of partitions in use, the total number of partitions is determined from these statistics.

In an example system that does not maintain statistics, the system assumes the table has a fixed number of partitions. In one example, the system assumes the total number of partitions is equal to the maximum number of partitions that the system can accommodate. In one example system this is 65,535.

In another example system, the system analyzes the partitioning expression to estimate the total number of partitions. One example of a partitioning expression is (x MOD 10)+1, where x is a variable, which will only produce values from one to ten. In that case, the total number of partitions is ten.

Another example system uses the Orders table detailed above that has a partitioning function based on date. If the example system assumes that entries in the table are limited to past and present dates, the example system will disregard any partitions for use in the future. It will subtract the number of "future" partitions from the total number of partitions to calculate the total number of partitions.

In block 1320, the system determines whether to use the ratio p/t or the minimum ratio to determine the estimated cost of the partition-sensitive method. In an example system, the system assumes that the maximum number of partitions in the system is equal to the maximum number of partitions that the system can accommodate. Therefore, the ratio p/t may be low, which may cause the partition-sensitive method to be chosen when it is not the lowest cost method. In the example system, the system chooses to use a minimum ratio in place of the estimated ratio p/t. In one example system the minimum ratio is 0.10. The example system will multiply the usual cost for index access by the minimum ratio.

Figure 14:
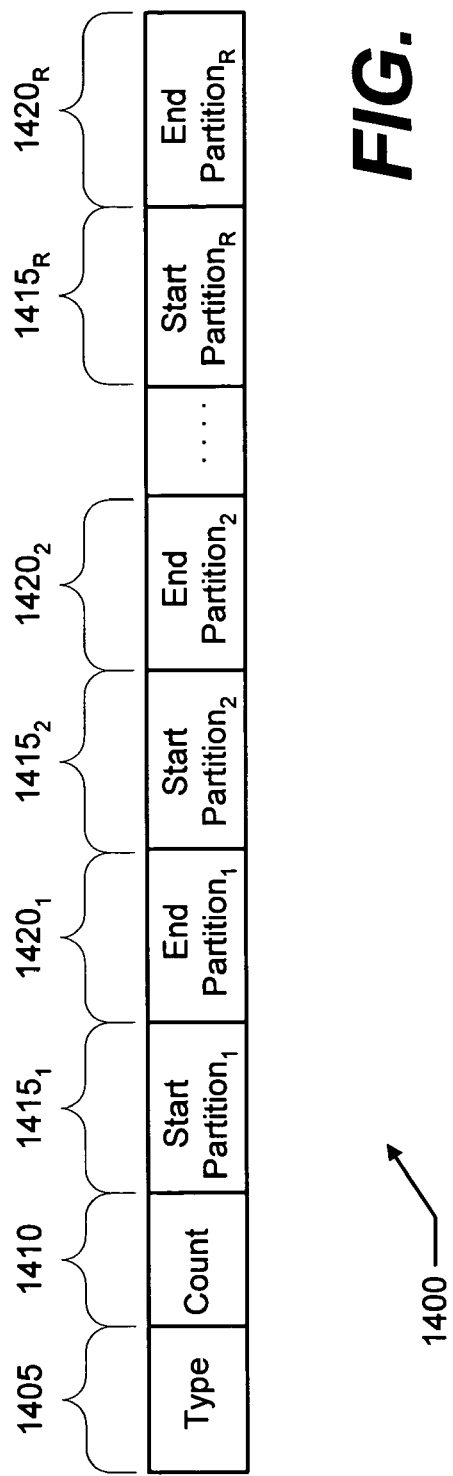
FIG. 14 is a data structure of a partition list.

FIG. 14 shows a data structure for a partition elimination list 1400. The partition elimination list 1400 includes a type field 1405, a count field 1410, one or more start partition fields 1415$_{1 \ldots R}$, and one or more end partition fields 1420$_{1 \ldots R}$. Each pair of the one or more start partition fields 1415$_{1 \ldots R}$ and the one or more end partition fields 1420$_{1 \ldots R}$ define a partition range. The type field 1405 contains one or more bits to indicate whether the partition elimination list 1400 is a partition exclusion list or a partition inclusion list. The count field 1410 contains one or more bits to indicate the number of partitions included. In an example partition elimination list 1400, the count field 1410 contains one or more bits to indicate the number of partition ranges defined by the partition list 1400. In another example partition elimination list 1400, the count field 1410 contains one or more bits indicating the number of bytes that follow the count field. The one or more start partition fields 1415$_{1 \ldots R}$ include one or more bits identifying a partition that is the start of a partition range. In one example partition elimination list 1400, the one or more start partition fields 1415$_{1 \ldots R}$ are two bytes long. The one or more end partition fields 1420$_{1 \ldots R}$ include one or more bits indicating a partition that is the end of a partition range. In one example partition elimination list 1400, the one or more end partition fields 1420$_{1 \ldots R}$ are two bytes long. An example partition elimination list 1400 contains the following information: Inclusion, 1, 4, 4. The example partition elimination list 1400 is a partition inclusion list that has one partition range that includes partition number 4. Another example partition elimination list 1400 contains the following information: Exclusion, 1, 4, 4. The example partition elimination list 1400 is a partition exclusion list that has one partition range and excludes partition four. Another example partition elimination list 1400 contains the following information: Inclusion, 2, 6, 8, 20, 23. The example partition list 1400 is a partition inclusion list that has two partition ranges and includes partitions six, seven, eight, twenty, twenty-one, twenty-two, and twenty-three.

Figure 15:
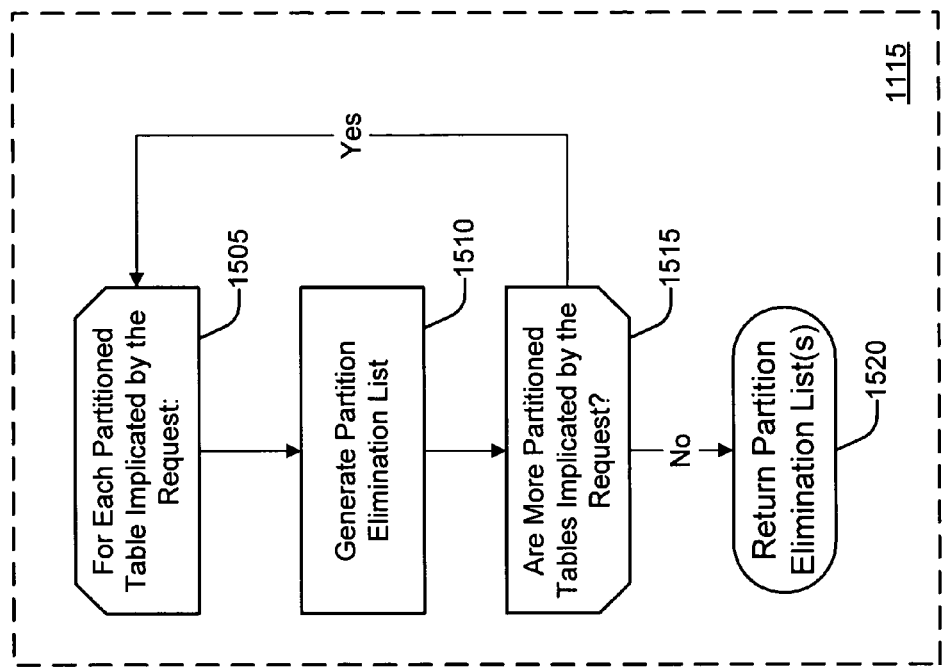
FIG. 15 is a flow chart illustrating the creation of one or more partition elimination lists.

Returning to FIG. 11, in block 1115 the system generates one or more partition elimination lists 1400. An example system for generating one or more partition elimination lists 1400 is shown in FIG. 15. The system loops for each of the partitioned tables implicated by the SQL request (block 1505). The system generates a partition elimination list 1400 for each partitioned table implicated by the SQL request (block 1510 which is described in greater detail with respect to FIG. 16). The loop continues if there are more partitioned tables implicated by the SQL request (block 1515). After one or more partition elimination lists 1400 are generated for each partitioned table implicated by the SQL request, the system returns the one or more partition elimination lists 1400 (block 1520).

Figure 16:
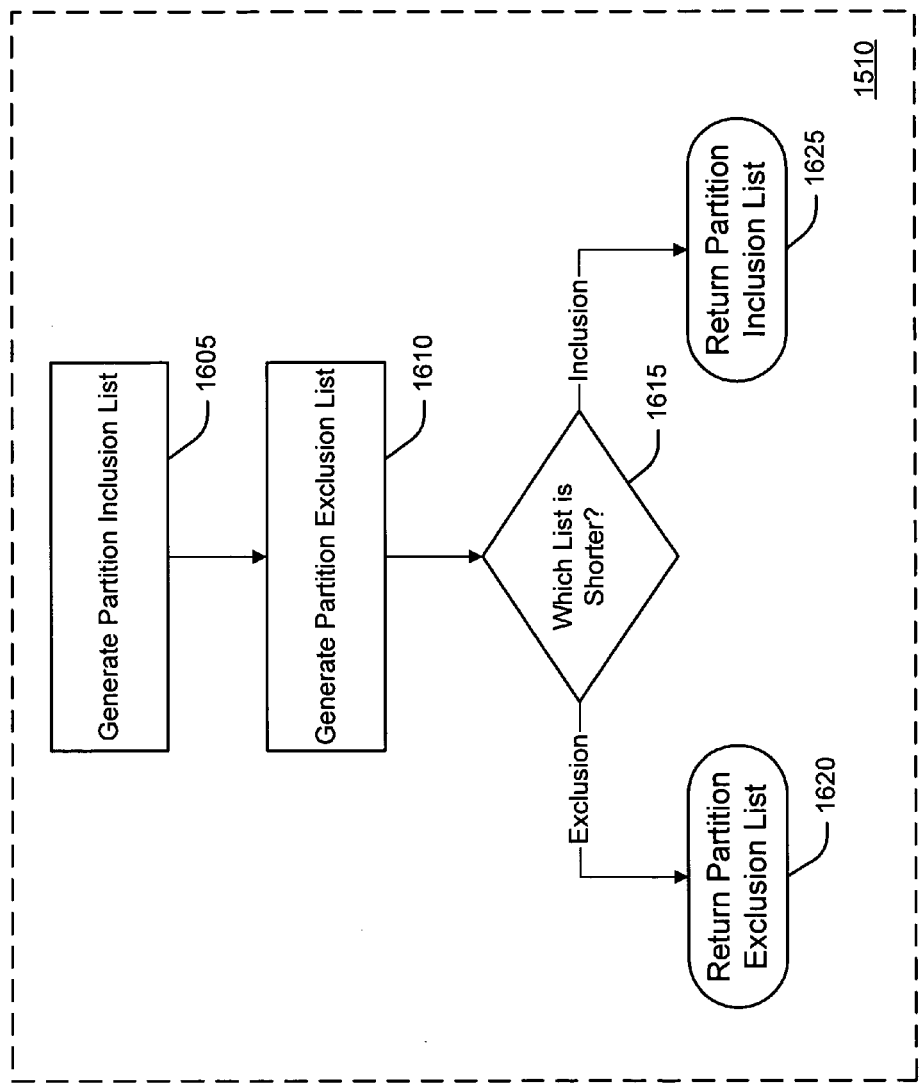
FIG. 16 is a flow chart illustrating the creation of a partition elimination list.

In block 1510, the system generates a partition elimination list 1400. FIG. 16 shows an example system for generating the partition elimination list 1400. The system generates a partition inclusion list (block 1605 which is shown in greater detail with respect to FIG. 17). The system generates a partition exclusion list (block 1610 which is shown in greater detail with respect to FIG. 18). The system determines whether the partition inclusion list or the partition exclusion list is shorter (block 1615). If the partition inclusion list is shorter, the system returns the partition inclusion list (block 1625). If the partition exclusion list is shorter, the system returns the partition exclusion list (block 1620).

Figure 17:
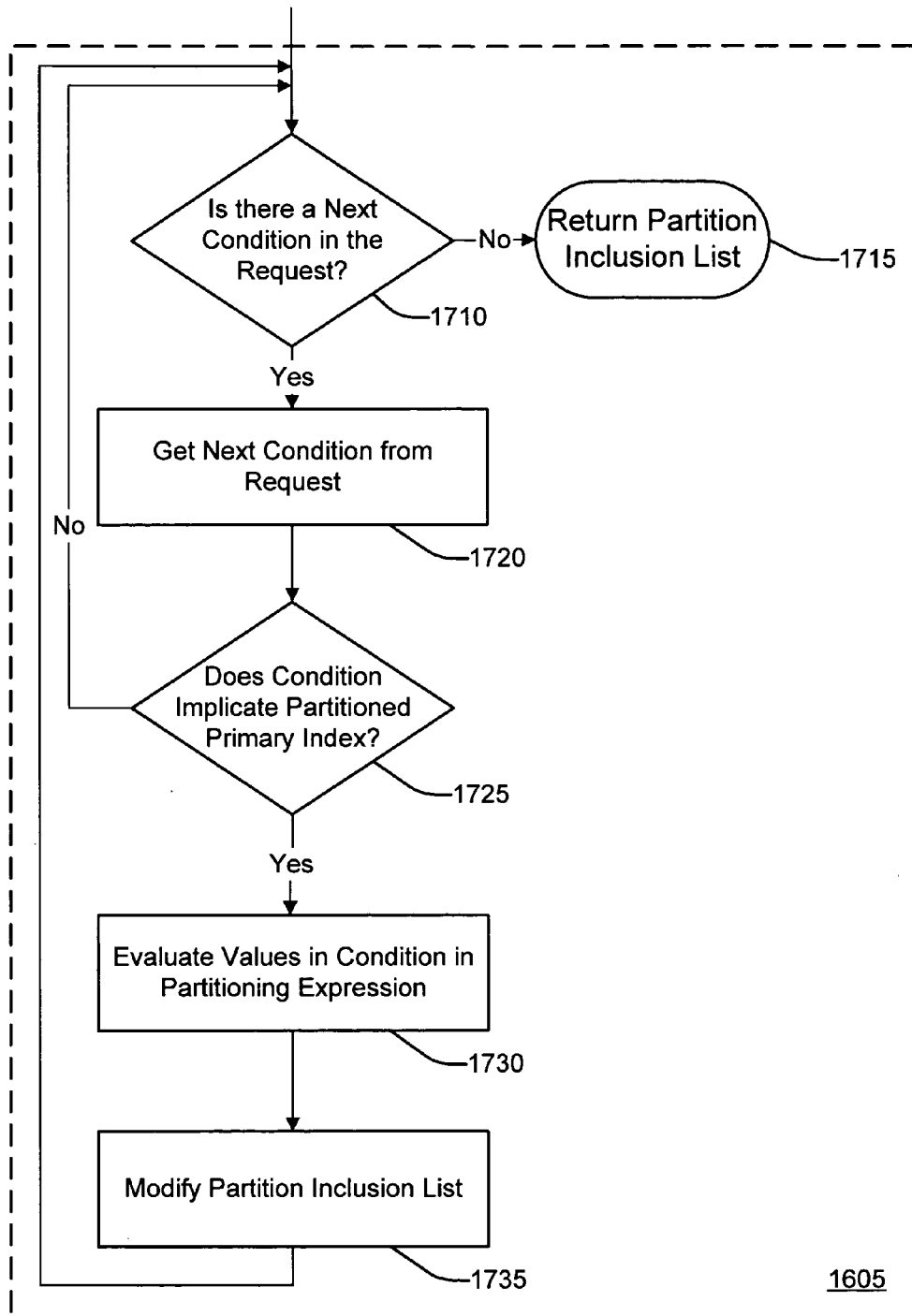
FIG. 17 is a flow chart illustrating the creation of a partition inclusion list.

In block 1605, the system generates a partition inclusion list for a partitioned table implicated by the SQL request. FIG. 17 shows an example system for generating a partition inclusion list. The system determines if there is another condition in the WHERE clause of the SQL request (block 1710). If there is not an additional condition, the system returns the partition inclusion list (block 1715). If there is an additional condition the system gets the next condition from the WHERE clause in the SQL request (block 1720) and determines if the condition implicates a partitioned primary index of the table (block 1725). If the condition does not implicate a partitioned primary index of the table the system returns to block 1710. If the condition implicates a partitioned primary index of the table the system evaluates the values of the condition in the WHERE clause using the partitioning function associated with the partitioned primary index (block 1730). The system modifies the partition inclusion list (block 1735) for the table and returns to block 1710. The modification of the partition inclusion list may include the addition of partition ranges, the removal of partition ranges, or the modification of partition ranges so that the partition inclusion list will reflect only the partitions implicated by the one or more conditions in the WHERE clause that implicate the partitioned primary index of the table. For a secondary index, the table's partition elimination list 1400 is associated with the index. For a join index, the partition elimination lists 1400 of each of the tables joined by the index are associated with the join index. In an example system, however, the system only associates partition elimination lists for partitioned tables not completely covered by the join index. This is because the join index has all columns necessary to fulfill the SQL request without referring to the completely covered table.

For example, assuming an example system uses the Orders table defined above, and receives the following SQL request: SELECT*FROM Orders WHERE ((date NOT BETWEEN '2001-01-05' AND '2001-03-02') AND total_price>100.00); The system starts and determines there is a next condition in the SQL request. The system gets the condition "date NOT BETWEEN '2001-01-05' AND '2001-03-02'." The system recognizes that the condition implicates the partitioned primary index and determines the range of values for the condition: "2001-01-05" and "2001-03-02." The system evaluates these values in the partitioning expression to determine that they correspond to partitions thirteen and fifteen, respectively. The system then modifies the partition inclusion list to include all partitions except thirteen through fifteen and returns to block 1710. The system gets the condition "total_price>100.00," which does not implicate the partitioned primary index, so the system returns to block 1710 where it is directed to end, because there are no more conditions in the request.

Figure 18:
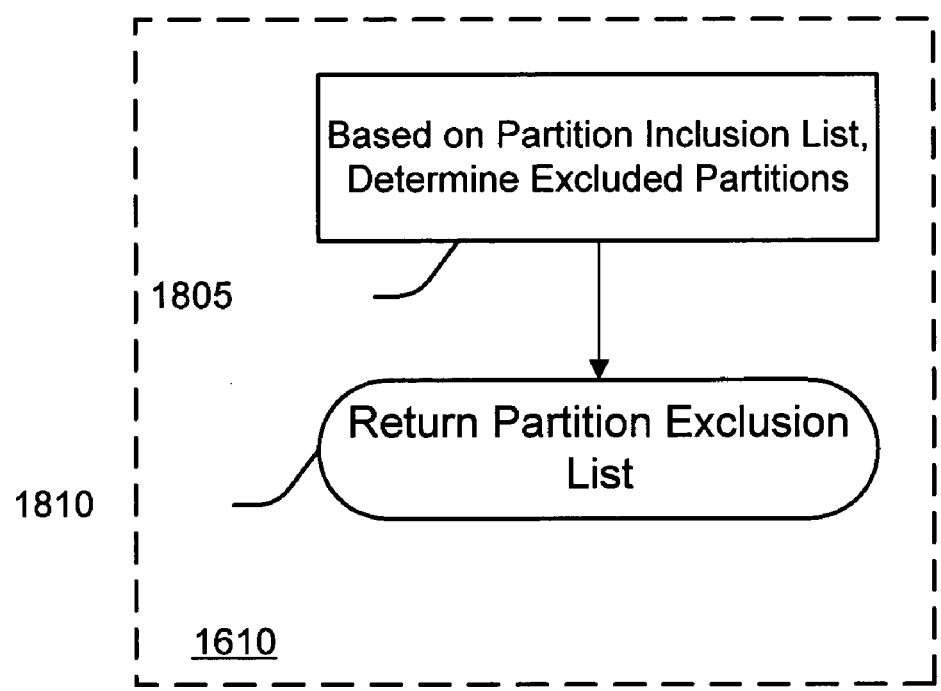
FIG. 18 is a flow chart illustrating the creation of a partition exclusion list.

Returning to FIG. 16, in block 1610, the system generates a partition exclusion list. FIG. 18 shows an example system for generating the partition exclusion list. The system generates the partition exclusion list based on the partition inclusion list (block 1805). The system may determine the partition exclusion list by starting with a list of all partitions and removing partitions listed in the partition inclusion list to arrive at the partition exclusion list. The system returns the partition elimination list 1400 (block 1810).

Figure 19:
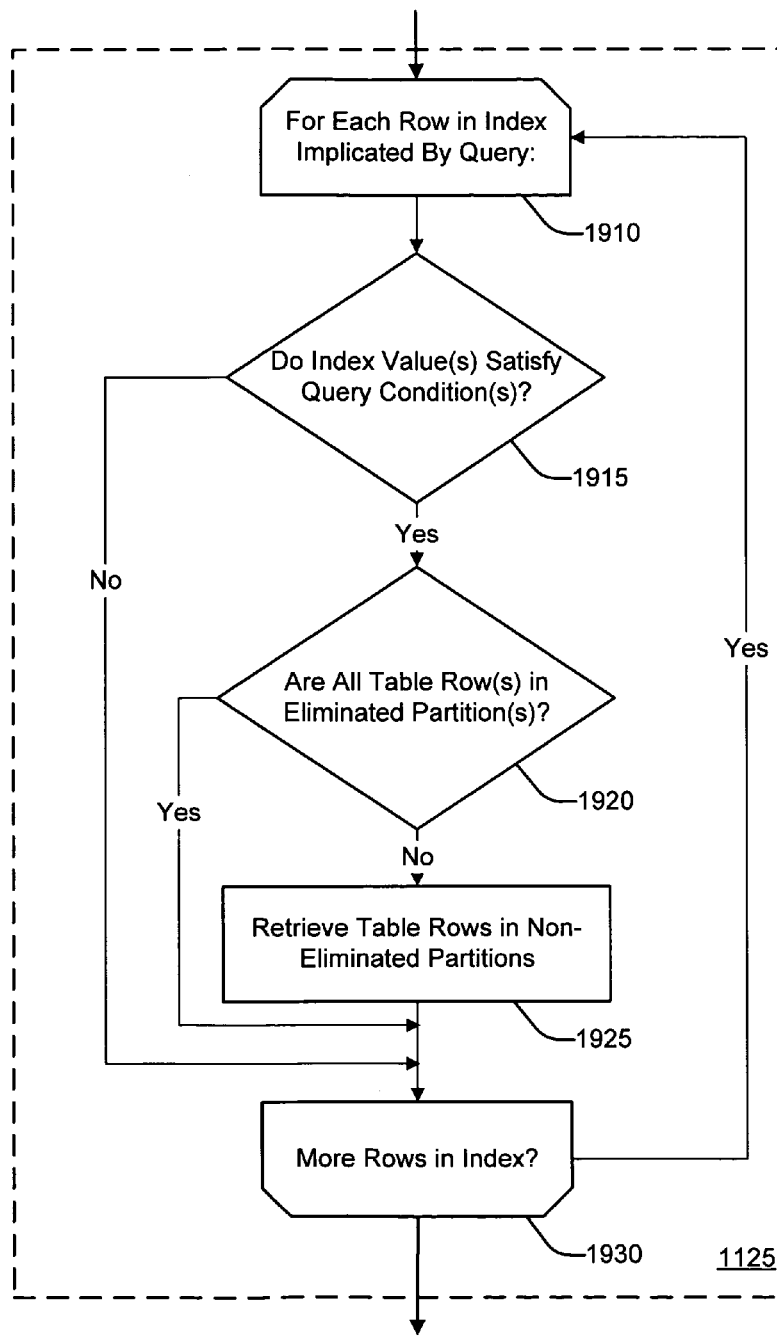
FIG. 19 is a flow chart illustrating the execution of a SQL request on non-eliminated partitions.

Returning to FIG. 11, in block 1130, the system performs the SQL request using the one or more partition elimination lists 1400 and the secondary or join index. An example system for performing the SQL request using the one or more partition elimination lists 1400 is shown in FIG. 19. The system loops once for each index row in the secondary or join index implicated by the query (block 1910). In one example system the rows in the secondary or join index implicated by the query include all the rows in the index. In another example system the rows in the secondary or join index implicated by the query only include a subset of the rows depending on the conditions on the index columns in the query. For example if there is a constant equality condition on the index values of a hash-ordered index, only the index rows with the same hash value of the index values need to be read. In another example, if the index is value ordered and there is range constraint, then only the index rows in the range need to be read. Blocks 1915, 1920, and 1925 describe actions of the system within the loop. The system determines if the one or more index values of the index row satisfy the conditions in the SQL request that implicate the index values (block 1915). If the one or more index values do not satisfy the one or more conditions, the system proceeds to block 1930. If the one or more index values satisfy the one or more conditions, the system proceeds to block 1920 where it determines if the one or more rows referenced by the one or more row IDs are in eliminated partitions (e.g., the partitions appear in a partition exclusion list or do not appear in a partition inclusion list for the table) (block 1920). One example system determines whether a row ID in an index row refers to a partition listed in the partition elimination list 1400 by examining the partition value of the row ID. If the one or more rows referenced by the one or more row IDs are not in eliminated partitions the system retrieves the one or more table rows and performs the SQL request on the retrieved rows (block 1925). If all rows referenced by the one or more row IDs are in eliminated partitions, the system proceeds to block 1930. The system continues to loop so long as there are more rows in the secondary or join index to process (block 1930). If there are not any more rows in the secondary or join index to process, the system returns to complete executing the query.

For example, assuming an example system uses the Orders table defined above, and receives the following SQL request: SELECT*FROM Orders WHERE ((date BETWEEN '2001-01-05' AND '2001-03-02') AND total_price>100.00); Further assume that there is a secondary index for total_price and a partition elimination list 1400 has been created. The system begins and reads each row in the secondary index that indexes total_price that is implicated by the query. If the index value does not satisfy the condition "total_price>100.00", the system loops and reads the next index row, if any. If the index value satisfies the condition "total_price>100.00," the system determines if each associated row ID references an eliminated partition. If the row ID refers to an eliminated partition, the system loops to check the next row ID and to reads the next row ID, if any. If the row ID does not refer to an eliminated partition, the row ID is kept for further processing in the query. In one example system the row ID is spooled and used to the read the row in the Orders table to process the query, loops, and reads the next row ID in the index, if any. After all row IDs of an index row are processed, the system reads the new index row. After all of the rows in the index are read, the system returns to complete the query.

The text above described one or more specific implementations of a broader invention. The invention also is carried out in a variety of alternative implementations and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. Many other implementations are also within the scope of the following claims.

What is claimed is:

1. A partition-sensitive index-assisted method for accessing a database, the database including a first table including one or more rows stored in one or more partitions, the database further including an index including one or more index entries, each index entry referencing a first target row in a first target partition, where the first target row is in the first table, the partition-sensitive index-assisted method including:
accepting a request having a first condition and a second condition;
creating a first partition elimination list based on the first condition;
using the index, identifying one or more first target rows implicated by the request because of the second condition;
reading the target rows identified by the one or more index entries, only if the target first partition of the first target row is not eliminated by the first partition elimination list.

2. The partition-sensitive index-assisted method of claim 1, where the first partition elimination list is a partition inclusion list and the first target row is eliminated if it is not listed in the first partition elimination list.

3. The partition-sensitive index-assisted method of claim 1, where the first partition elimination list is a partition exclusion list and the first target row is eliminated if it is listed in the first partition elimination list.

4. The partition-sensitive index-assisted method of claim 1, where the database includes a partitioning expression for determining into which partition each of the one or more rows is placed, and where creating the first partition elimination list includes:
   evaluating the first condition using the partitioning expression.

5. The partition-sensitive index-assisted method of claim 1, where the index is a secondary index.

6. The partition-sensitive index-assisted method of claim 1, where the index is a join index.

7. The partition-sensitive index-assisted method of claim 1, where the database further includes a second table including one or more rows stored in one or more partitions, each index entry of the join-index further references a second target row in a second target partition, where the second target row is in the second table, and where accessing the database further includes:
   creating a second partition elimination list of one or more second table partitions based on one of the request conditions;
   reading the target rows identified by the one or more index entries, only if the first target partition of the first target row is not eliminated by the first partition elimination list and the second target partition of the second target row is not eliminated by the second partition elimination list.

8. The partition-sensitive index-assisted method of claim 7, where the second partition elimination list is a partition inclusion list and the second target row is eliminated if it is not listed in the second partition elimination list.

9. The partition-sensitive index-assisted method of claim 7, where the second partition elimination list is a partition exclusion list and the second target row is eliminated if it is listed in the second partition elimination list.

10. The partition-sensitive index-assisted method of claim 1, further including:
   determining an estimated cost of using the partition-sensitive method to access the database, where the estimated cost is a normal cost of performing the request multiplied by an adjustment factor.

11. The partition-sensitive index-assisted method of claim 10, where the adjustment factor is equal to a minimum number of non-eliminated partitions divided by a total number of partitions.

12. The partition-sensitive index-assisted method of claim 11, where the minimum number of non-eliminated partitions is determined by analyzing the request.

13. The partition-sensitive index-assisted method of claim 11, where the total number of partitions is determined based on statistics, where the statistics are maintained by the database.

14. The partition-sensitive index-assisted method of claim 11, where the total number of partitions is determined by analyzing a partitioning expression, the partitioning expression determining into which partition each of the one or more rows is placed.

15. The partition-sensitive index-assisted method of claim 10, where the adjustment factor is a minimum ratio.

16. The partition-sensitive index-assisted method of claim 15, where the minimum ratio is 0.10.

17. A database system including:
   a massively parallel processing system including:
      one or more nodes;
      a plurality of CPUs, each of the one or more nodes providing access to one or more CPUs;
      a plurality of data storage facilities each of the one or more CPUs providing access to one or more data storage facilities;
      P partitions, each partition residing on one or more data storage facilities;
   a process for performing a request, where the database system stores a first table including one or more rows stored in one or more partitions, the database further storing an index including one or more index entries, each index entry referencing a first target row in a first target partition, where the first target row is in the first table, and performing the request includes:
      accepting a request having a first condition and a second condition;
      creating a first partition elimination list based of the first condition;
      using the index, identifying one or more first target rows implicated by the request because of the second condition;
      reading the target rows identified by the one or more index entries, only if the target first partition of the first target row is not eliminated by the first partition elimination list.

18. The database system of claim 17, where the first partition elimination list created by the process is a partition inclusion list and the first target row is eliminated if it is not listed in the first partition elimination list.

19. The database system of claim 17, where the first partition elimination list created by the process is a partition exclusion list and the first target row is eliminated if it is listed in the first partition elimination list.

20. The database system of claim 17, where the database system further includes a partitioning expression for determining into which partition each of the one or more rows is placed, and where creating the first partition elimination list includes:
   evaluating the first condition using the partitioning expression.

21. The database system of claim 17, where the index is a secondary index.

22. The database system of claim 17, where the index is a join index.

23. The database system of claim 17, where the database system further stores a second table including one or more rows stored in one or more partitions, each index entry of the index further references a second target row in a second target partition, where the second target row is in the second table, and where performing the request further includes:
   creating a second partition elimination list of second table partitions based on one of the request conditions; and
   reading the target rows identified by the one or more index entries, only if the first target partition of the first target row is not eliminated by the first partition elimination list and the second target partition of the second target row is not eliminated by the second partition elimination list.

24. The database system of claim 23, where the second partition elimination list is a partition inclusion list and the second target row is eliminated if it is not listed in the second partition elimination list.

25. The database system of claim 23, where the second partition elimination list is a partition exclusion list and the second target row is eliminated if it is listed in the second partition elimination list.

26. The database system of claim 17, where performing the request further includes:
   determining an estimated cost of using the partition-sensitive method to access the database, where the estimated cost is a normal cost of performing the request multiplied by an adjustment factor.

27. The database system of claim 26, where the adjustment factor is equal to a minimum number of non-eliminated partitions divided by a total number of partitions.

28. The database system of claim 27, where the minimum number of non-eliminated partitions is determined by analyzing the request.

29. The database system of claim 27, where the total number of partitions is determined based on statistics, where the statistics are maintained by the database.

30. The database system of claim 27, where the total number of partitions is determined by analyzing a partitioning expression, the partitioning expression determining into which partition each of the one or more rows is placed.

31. The database system of claim 26, where the adjustment factor is a minimum ratio.

32. The database system of claim 31, where the minimum ratio is 0.10.

33. A computer program, stored on a tangible storage medium, the program containing executable instructions that cause a computer to execute a request in a database running in a partitioned parallel environment including P partitions, each partition residing on one or more parallel processing systems, the database including a first table including one or more rows stored in one or more of the P partitions, the database further including an index including one or more index entries, each index entry referencing a first target row in a first target partition, where the first target row is in the first table, the program including executable instructions that cause a computer to:
   accept a request having a first condition and a second condition;
   create a first partition elimination list based of the first condition;
   using the index, identify one or more first target rows implicated by the request because of the second condition; and
   read the target rows identified by the one or more index entries, only if the target first partition of the first target row is not eliminated by the first partition elimination list.

34. The computer program of claim 33, where the first partition elimination list is a partition inclusion list and the first target row is eliminated if it is not listed in the first partition elimination list.

35. The computer program of claim 33, where the first partition elimination list is a partition exclusion list and the first target row is eliminated if it is listed in the first partition elimination list.

36. The computer program of claim 33, where the database includes a partitioning expression for determining into which partition each of the one or more rows is placed, and when creating the first partition elimination list, the computer:
   evaluates the first condition using the partitioning expression.

37. The computer program of claim 33, where the index is a secondary index.

38. The computer program of claim 33, where the index is a join index.

39. The computer program of claim 33, where the database further includes a second table including one or more rows stored in one or more partitions, each index entry of the index further references a second target row in a second target partition, where the second target row is in the second table, and when accessing the database, the computer program:
   creates a second partition elimination list of second table partitions based on one of the request conditions;
   reads the target rows identified by the one or more index entries, only if the first target partition of the first target row is not eliminated by the first partition elimination list and the second target partition of the second target row is not eliminated by the second partition elimination list.

40. The computer program of claim 39, where the second partition elimination list is a partition inclusion list and the second target row is eliminated if it is not listed in the second partition elimination list.

41. The computer program of claim 39, where the second partition elimination list is a partition exclusion list and the second target row is eliminated if it is listed in the second partition elimination list.

42. The computer program of claim 33, further including executable instructions that cause the computer to:
   determine an estimated cost of using the partition-sensitive method to access the database, where the estimated cost is a normal cost of performing the request multiplied by an adjustment factor.

43. The computer program of claim 42, where the adjustment factor is equal to a minimum number of non-eliminated partitions divided by a total number of partitions.

44. The computer program of claim 43, where the minimum number of non-eliminated partitions is determined by analyzing the request.

45. The computer program of claim 43, where the total number of partitions is determined based on statistics, where the statistics are maintained by the database.

46. The computer program of claim 43, where the computer determines the total number of partitions by analyzing a partitioning expression, the partitioning expression determining into which partition each of the one or more rows is placed.

47. The computer program of claim 42, where the adjustment factor is a minimum ratio.

48. The computer program of claim 47, where the minimum ratio is 0.10.

* * * * *